Patented Nov. 3, 1942

UNITED STATES PATENT OFFICE 2,300,413

SOAP AND METHOD OF MAKING

Kenneth M. Gaver, Columbus, Ohio, assignor to The Komel Corporation, Dayton, Ohio, a corporation of Delaware No Drawing. Application February 24, 1941, Serial No. 380,307

20 Claims. (Cl. 252—369)

This invention relates to soaps, and more particularly to starch derivative soaps which are adapted for use as laundry, face, shampoo, or shaving soaps.

It is the principal object of this invention to produce an improved soap which is substantially neutral, forms stable lather, readily emulsifies with dirt, grease, etc., and is easily rinsed off leaving the skin or article clean and free from any residue.

It is another object to provide an improved method of making soaps utilizing alkali metal starchate as the saponifying agent whereby there is produced a soap possessing enhanced dispersing and wetting properties as compared with ordinary soaps.

Another object is to provide a soap having improved wetting and dispersing properties and which includes a starch derivative constituent.

Still another object is to make a soap which has improved rinsing and emulsifying properties and can be used efficiently with hard and soft water.

These and other objects and advantages will appear from the following description.

It has been the practice heretofore to manufacture soaps by reacting animal fats and vegetable fats and oils with alkali metal hydroxides. More recently, sulfonated soaps have been made from sulfonic acid salts of long chain aliphatic alcohols. The essential property of the various types of soaps is their ability to form colloidal solutions with water causing other substances to pass into colloidal solution or to form emulsions. The high molecular weight organic compounds tend to enhance this colloidal characteristic.

I have discovered that an improved soap can be made by utilizing starch reacted with alcohol soluble hydroxides, such as sodium, potassium, and the like, under conditions which will produce a metallic starch alcoholate wherein the alkali metal is attached through an oxygen atom to a carbon atom in the complex α-glucopyranose or α-glycopyranose residue of the starch molecule. This alkali metal starchate compound when placed in water spontaneously hydrolyzes forming a limpid colloidal solution wherein the particles are highly dispersed throughout the solution. It has been discovered that by employing this alkali metal starchate compound as a saponifying agent for the fat or oil, a soap having improved colloidal dispersing properties is produced which is readily soluble in water and can be used even in hard water, since the calcium and magnesium salts which may be formed are also colloidally soluble as the metallic starchate.

The formation of aqueous colloidal solutions of alkali metal starchate which possess a high filterability and enhanced dispersion properties was unexpected, since the ordinary metal hydroxide starch addition products or mixtures do not possess this characteristic and do not lower the surface tension of water to the same extent as with the use of alkali metal starchate compounds as utilized in preparing the soaps of this invention.

The method of making my alkali metal starchate forms no part of this invention and is disclosed and described in my prior application, Serial No. 357,995, filed September 23, 1940.

In general, the method of making soaps according to my invention may be illustrated by the following reaction:

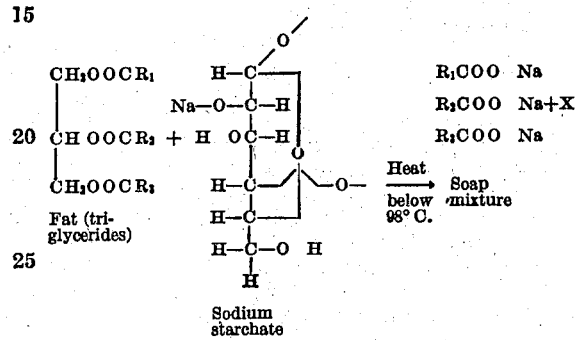

$R_1$, $R_2$ and $R_3$ represent organic alkyl radicals which may be identical or different; and X represents a glyceryl ester of starch or an alkyl ester of starch or mixtures of both. This reaction product is preferably not separated, for it adds to the soap certain desirable properties such as enhancing the ease of the rinsing away of the soap during use. Where it is desired to separate the starch derivative products formed, it may be accomplished by treating the mixture with ethyl alcohol. Some free glycerol may be formed along with the glyceryl ester of starch depending upon the particular amounts of ingredients used and the conditions under which the reaction is carried out. Any glycerol formed may, if desired, be separated from the soap similarly as is the conventional practice in making ordinary soaps.

The following is a typical example of the formulation of my soap product:

Example I 100 to 125 parts by weight of coconut oil having a saponification number of about 260 is saponified with the addition of 100 to 125 parts by weight of sodium starchate (18.5% NaOH). After the saponification of the oil has been effected, from 10 to 20 parts by weight of sodium starchate is added to the saponified coconut oil to supply excess of the saponifying agent to accelerate the reaction to completion. Thereafter, sufficient oleic or stearic acid is introduced to neutralize the excess alkali. Ordinarily from 1 to 5 parts by weight of oleic or stearic acid is sufficient to neutralize the alkali.

In compounding the above substances to form the soap, the sodium starchate may be used as the alcohol wet filter cake formed during its manufacture, or when supplied dry, it is wetted with 95% ethyl alcohol solution. After saponifying the oil or fat, mixing is continued and the alcohol is evaporated and recovered. Where it is necessary, the product is rewetted with alcohol to insure maximum conversion of the oil to soap and the alcohol then evaporated. The neutralization of the excess alkali may be effected at any stage or repeated until the final product is substantially neutral. After the fat or oil has been thoroughly saponified and neutralized, the product is ground, screened and packed.

Where it is desired to form the soap product in the shape of a chip or cake, the formulation will be modified accordingly and suitable apparatus employed for accomplishing this.

The soaps may be made by the so-called "boiled process" or "cold process." In the boiled process, the fats are boiled with sodium starchate until saponification is completed, then sodium chloride or brine is introduced to precipitate or "salt out" the soap, which is a mixture of the alkali metal salts of the fatty acids that were present in the fats.

Another typical example is as follows:

Example II

To 100 parts by weight of palm oil or olive oil there is introduced from 100 to 125 parts by weight of sodium or potassium starchate to saponify the oil. Sufficient sodium starchate is added in excess to hasten the completion of the saponification. Sufficient oleic or stearic acid is introduced to neutralize the excess alkali to produce a substantially neutral product. As in Example I, the alkali metal starchate is introduced wet with 95% ethyl alcohol or other suitable solvent.

It will be understood that other fats or neutral esters comprising fats and oils, such as tallow, lard, corn, soy bean, castor, cottonseed and hydrogenated oils may be used in the examples.

In the preparation of toilet soaps larger proportions of the essential oils are used, while in laundry soaps the cheaper oils or mixtures may be used. Rosin or other like resins may be incorporated to increase the lathering properties. Palmitic acid may be employed in place of oleic or stearic acid. Further, other organic acids, such as oxalic, lactic, tartaric, citric, benzoic, butyric, etc. may be utilized to neutralize the excess alkali.

The foregoing examples disclose broadly the method of compounding my soap product using alkali metal starchates as the saponifying agent. Soaps made from the metallic starchates have improved wetting and dispersing properties. The soap products readily disseminate in water and spontaneously form homogeneous colloidal dispersions. The soaps made according to my invention possess wetting and emulsifying characteristics greatly superior to ordinary soaps.

It will be understood that the particular proportions set forth in the examples are merely typical and that my invention contemplates the preparation of soaps in various forms, such as liquid, solid, or powdered wherein a metal amylaceous compound is reacted with the oil or fat to saponify the same to form the soap. Further, varying proportions of ingredients may be employed, and modifying agents such as glycerin, water soluble gums, and the like may be introduced to prevent too rapid drying or otherwise modify its characteristic properties depending on the kind of product desired.

It will be also understood that my invention is adapted for widely different embodiments where improved soaps or soap emulsions are utilized and that this process and product are comprehended within my invention.

Further, it will be understood that such modifications as may be required to produce the desired soap products under different conditions and uses are contemplated to be within the scope of my invention.

Having thus fully described my invention, what I claim as new and desire to secure by Letters Patent, is:

1. A composition of matter comprising a soap containing as saponifier an amylaceous compound of the formula

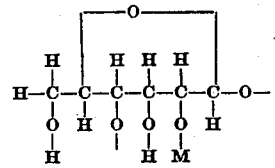

in which M is an alkali metal the hydroxide of which is soluble in ethanol.

2. A composition of matter comprising a soap formed by saponifying fat or oils with an alkali metal amylaceous compound of the formula

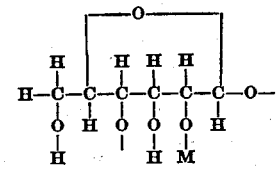

in which M is an alkali metal the hydroxide of which is soluble in ethanol.

3. A composition of matter comprising a soap formed by reacting fat with a metal starchate compound of the formula

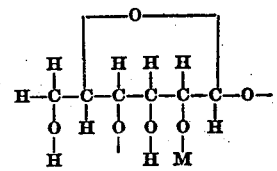

in which M is an alkali metal the hydroxide of which is soluble in ethanol.

4. A composition of matter comprising a soap formed by saponifying vegetable oil or fat with alkali metal starchate of the formula

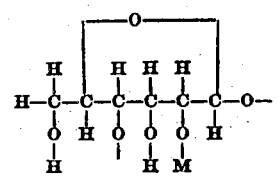

in which M is an alkali metal the hydroxide of which is soluble in ethanol.

5. As a new composition of matter, a soap comprising a reaction product of a vegetable oil or fat saponified with alkali metal starchate of the formula

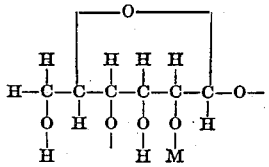

in which M is an alkali metal the hydroxide of which is soluble in ethanol.

6. As a new article of manufacture, a soap comprising an ester derivative of an alkali metal starchate.

7. As a new article of manufacture, a soap comprising the reaction product of fat with alkali metal starchate and represented as follows:

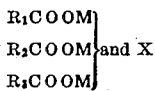

where $R_1$, $R_2$ and $R_3$ are alkyl radicals; M represents an alkali metal and X is an ester of starch.

8. The process of making a soap comprising the step of saponifying fat or oil with alkali metal starchate.

9. The process of making a soap comprising saponifying vegetable oil or fat with alkali metal starchate, neutralizing the excess alkali, and recovering the reaction product.

10. A method of making soap comprising saponifying fat with alkali metal starchate utilizing an excess of starchate, incorporating organic acid in sufficient amount to neutralize the excess alkali, and evaporating the product to produce a soap of the desired consistency.

11. A method of making soap comprising reacting a fatty oil with an alkali metal starchate compound to saponify the oil, adding excess alkali metal starchate to accelerate the reaction to completion, adding organic acid sufficient to neutralize the excess alkali, and removing the soap product produced.

12. A method of making a soap comprising saponifying a fat substance with alkali metal starchate cake wet with volatile solvents, neutralizing the reaction product, and distilling off the volatile solvents to recover the soap.

13. In a method of making soap, the steps of saponifying the fatty constituent with alkali metal starchate wetted with alcohol and recovering the alcohol by evaporation while simultaneously stirring the saponified mass.

14. In a method of producing soap, the step of reacting the ingredients with alkali metal starch alcoholate in which the metal is attached through an oxygen atom to the carbon atom in the two position.

15. In a method of producing soap, the steps of reacting the ingredients with alkali metal starch alcoholate in which the metal is attached through an oxygen atom to the carbon atom in the two position, said alcoholate being wet with alcohol, and recovering the alcohol by distillation.

16. A method of making a soap product comprising reacting a fatty constituent with alkali metal starchate in which the metal is attached through an oxygen atom to the carbon atom in the two position to saponify the same, said alkali metal starchate being added in excess, and incorporating sufficient high molecular weight organic acid to neutralize the excess alkali.

17. A method of making a soap product comprising saponifying the fat with alkali metal starchate utilizing an excess of starchate, neutralizing the mass with the addition of organic acid, said alkali metal starchate being incorporated wet with alcohol, recovering the alcohol from the mass after saponification by distillation, and salting out the soap formed.

18. The method of making a soap product comprising reacting fat constituents with alkali metal starchate to saponify the same, neutralizing the mass, and recovering the soap.

19. In the method of making a soap product, the step of reacting fatty material with alkali metal starchate.

20. A soap composition consisting of the reaction products formed by reacting fatty material with alkali metal starchate.

KENNETH M. GAVER.